United States Patent [19]

Neuray et al.

[11] 3,894,991
[45] July 15, 1975

[54] HIGH MOLECULAR POLYCARBONATES CONTAINING S-TRIAZINE RINGS

[75] Inventors: Dieter Neuray, Rumeln, Kaldenhausen; Hugo Vernaleken; Hans Rudolph, both of Krefeld-Bockum, all of Germany

[73] Assignee: Bayer Aktiengesellschaft, Leverkusen, Germany

[22] Filed: Sept. 14, 1973

[21] Appl. No.: 397,502

[30] Foreign Application Priority Data
Sept. 20, 1972 Germany............................ 2246106

[52] U.S. Cl.......... 260/47 XA; 260/49; 260/77.5 D; 260/79; 260/79.3 M; 260/37 PC
[51] Int. Cl............................................ C08g 17/13
[58] Field of Search......................... 260/47 XA, 49

[56] References Cited
UNITED STATES PATENTS
3,525,712  8/1970  Kramer .......................... 260/47 XA
3,541,049  11/1970  Cleveland ...................... 260/47 XA OTHER PUBLICATIONS
Polyphenylene–s–triazinyl Ethers, L. G. Picklesimer et al., J. Polymer Sci., part A, Vol. 3, pp. 2673–2684, (1965).

*Primary Examiner*—Wilbert J. Briggs, Sr.
*Attorney, Agent, or Firm*—Lawrence S. Pope

[57] ABSTRACT
Polycarbonates based on aromatic bis-hydroxy compounds which contain s-triazines of the formula

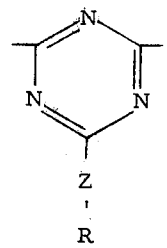

where:

Z represents a single bond, —O—, —S—, —NH— or —NR⁶—, where $R^6$ denotes hydrogen, n-alkyl radicals with 1 to 30 carbon atoms or their isomers, n-alkenyl radicals with 2 to 30 carbon atoms or their isomers, cycloalkyl radicals with 5 to 12 carbon atoms, alkyl-substituted or alkenyl-substituted cycloalkyl radicals with 5 – 12 ring carbon atoms and 1 to 5 carbon atoms in the side-chain, mononuclear or polynuclear aryl or heteroaryl radicals, such as pyridine, pyprimidine or imidazole radicals, with up to 14 carbon atoms, or aralkyl radicals with a total of up to 30 carbon atoms or the aryl-carbon atom bonded halogen and/or $C_1$-$C_6$-alkyl and/or $C_1$-$C_6$-alkoxy and/or nitrosubstituted derivatives of the aryl, heteroaryl or aralkyl radicals;

R has the same meaning as $R^6$, and is identical or not identical with $R^6$, and can be linked to $R^6$ via alkylene radicals with 2 to 5 carbon atoms which can be interrupted by hetero-atoms, such as O, S and $NR^7$, that is R + $R^6$ can be alkylene with 2 to 5 carbon atoms which can be interrupted by O,S and $NR^7$, with the proviso that the rings formed by R, Z and $R^6$ are from three- to six-membered rings; and wherein $R^7$ is an alkyl radical with 1 to 4 carbon atoms, a phenyl radical or an alkylaryl radical with a total of up to 10 carbon atoms, or R and $R^6$ can be aryl linked via a single bond or O or S, as linkages between the aromatic bis-hydroxy compounds and bonded to the oxygen atoms of the latter.

13 Claims, No Drawings

HIGH MOLECULAR POLYCARBONATES CONTAINING S-TRIAZINE RINGS

SUMMARY AND DETAILED DESCRIPTION OF THE INVENTION

The present invention relates to high molecular polycarbonates based on aromatic bis-hydroxy compounds which contain s-triazine rings of the following general formula 1

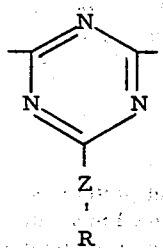

in which

Z represents a single bond, —O—, —S—, —NH— or —NR$^6$—,
wherein

R$^6$ denotes hydrogen, n-alkyl radicals with 1 to 30 carbon atoms, n-alkenyl radicals with 2 to 30 carbon atoms or their isomers, cycloalkyl radicals with 5 to 12 carbon atoms, alkyl-substituted or alkenyl-substituted cycloalkyl radicals with 5 – 12 ring carbon atoms and 1 to 5 carbon atoms in the side-chain, mononuclear or polynuclear aryl or heteroaryl radicals, such as pyridine, pyrimidine or imidazole radicals, with up to 14 carbon atoms, or aralkyl radicals with a total of up to 30 carbon atoms or the aryl-carbon atom bonded halogen and/or C$_1$–C$_6$-alkyl and/or C$_1$–C$_6$-alkoxy and/or nitrosubstituted derivatives of the aryl, heteroaryl or aralkyl radicals;

R has the same meaning as R$^6$, and is identical or not identical with R$^6$, and can be linked to R$^6$ via alkylene radicals with 2 to 5 carbon atoms which can be interrupted by hetero-atoms, such as O, S and NR$^7$, that is R + R$^6$ can be alkylene with 2 to 5 carbon atoms which can be interrupted by O,S and NR$^7$, with the proviso that the rings formed by R, Z and R$^6$ are from three- to six-membered rings; and
wherein R$^7$ is an alkyl radical with 1 to 4 carbon atoms, a phenyl radical or an alkylaryl radical with a total of up to 10 carbon atoms,
or R and R$^6$ can be aryl linked via a single bond or O or S, as linkages between the aromatic bis-hydroxy compounds and bonded to oxygen atoms of the latter.

The new high molecular polycarbonates are essentially built up of identical or non-identical structural units of the following general formula 1a

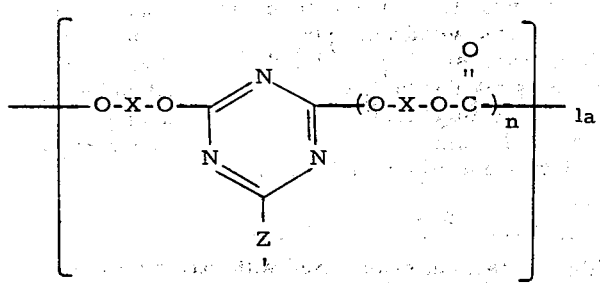

in which

Z, R, R$^6$ and R$^7$ have the same meaning as indicated under formula 1 and n is a number between 1 and 100, preferably between 1 and 20, X denotes an o-, m- or p-phenylene radical, an o-, m- or p-phenylene radical with one or more substitutents, possible substitutents being, for example, lower alkyl groups with 1 to 4 carbon atoms, or halogen atoms, among these especially chlorine or bromine, or denotes a radical characterized by the formula 2

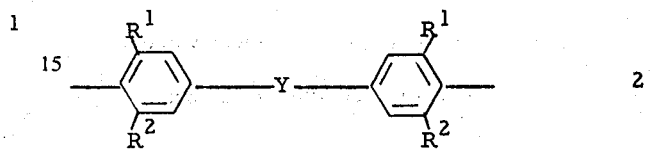

in which

R$^1$ and R$^2$ represent hydrogen atoms, n-alkyl radicals with 1 to 4 carbon atoms and their isomers, or halogen atoms, among the latter preferably chlorine or bromine atoms, and have identical or different meanings, Y denotes a single bond, an alkylene or alkylidene radical with 1 to 7 carbon atoms, a cycloalkylene or cycloalkylidene radical with 5 to 12 carbon atoms, $$-O-,\ -S-,\ -\underset{\underset{O}{\|}}{C}-,\ -\underset{\underset{O}{\|}}{S}-,$$

–SO$_2$– or a radical of the formula 3a or 3b

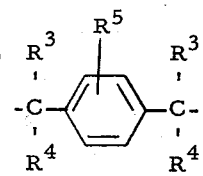 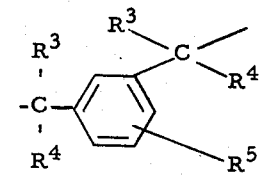

3a 3b wherein

R$^3$ to R$^5$ denote alkyl radicals with 1 to 5 carbon atoms, but

R$^5$ can also represent halogen atoms, for example chlorine or bromine;

The average molecular weight ($\overline{M}_{LS}$) of the polycarbonates according to the invention is generally above 10,000, preferably between 20,000 and 200,000. However, it is also possible without difficulty, to manufacture polycarbonates, containing s-triazine rings, of lower molecular weights.

The end groups of the new polycarbonates have no decisive influence on the properties of the products. For the sake of completeness, the following may be mentioned as end groups A for the left-hand side of the above structural formula, and as end groups B for the right-hand side:

A represents H, 

or a radical of the formula 4

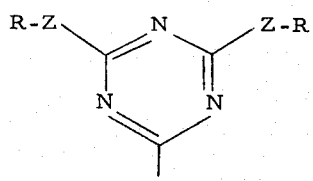
4 wherein $R^8$ is a phenyl radical or a phenyl radical with one or more substituents, and Z and R have the abovementioned meaning;

B represents $-OR^8$ wherein $R^8$ has the abovementioned meaning.

As a result of the incorporation of the s-triazine structural units, the new high molecular polycarbonates according to the invention have a raised glass transition temperature and increased stability to saponification, and also improved burning behavior relative to comparable polycarbonates which do not contain any co-condensed s-triazine structural units. These effects were not foreseeable.

In contrast to the polycarbonate, described in SU-PS No. 240,233, based on the bis-hydroxy compound 5 with a reactive chlorine atom in the s-triazine system

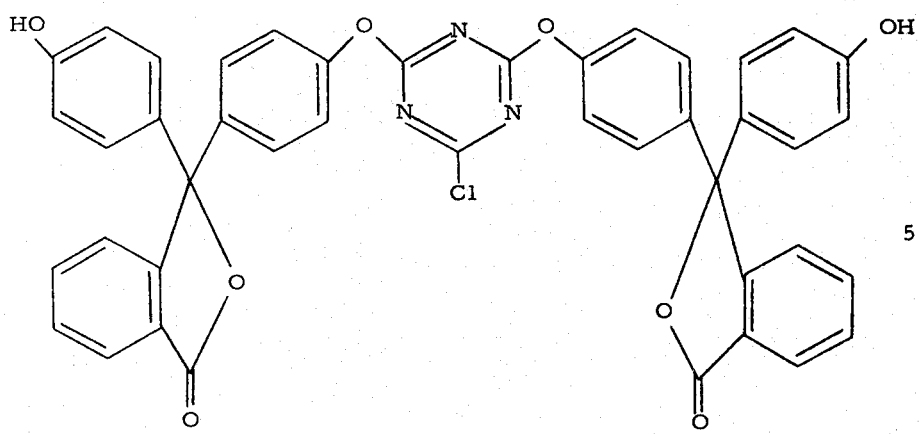
5 which can furthermore only be obtained in a low molecular weight, the high molecular polycarbonates according to the invention, containing s-triazine rings, can surprisingly be obtained in a high molecular weight even if in the general formula 1a n is equal to 1, that is to say if homocondensates containing s-triazine are concerned. Additionally, in contrast to the polycarbonate manufactured according to SU-PS No. 240,233 from the compound 5 and phosgene, the compounds of the invention show very good tough-elastic properties which manifest themselves, for example, in an excellent impact resistance and a good elongation at break.

The copolycarbonates manufactured according to SU-PS No. 240,233 from the compound 5 and 2,2-bis-(4-hydroxyphenyl)-propane show considerable shortcomings in processing by extrusion and injection molding because, firstly, thermal decomposition occurs, with its associated elimination of hydrogen chloride, which causes corrosion of the processing machines and, secondly, undesirable discoloration of the products occurs. These disadvantages do not arise in the new high molecular polycarbonates according to the invention, which contain s-triazine rings. They can be processed without thermal decomposition to give colorless, transparent moldings.

The new high molecular polycarbonates according to the invention, containing s-triazine rings, are obtained by reacting dihalogeno-s-triazines of the formula 6

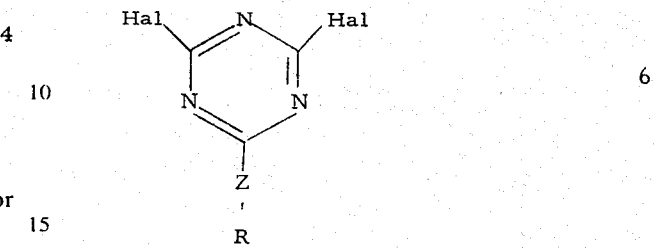
6 wherein

Hal denotes F, Cl, Br and I, but preferably Cl, and

Z and R have the abovementioned meaning with at least two equivalents of an aromatic dihydroxy compound of the formula 7

$$HO-X-OH \quad\quad 7$$

wherein

X has the abovementioned meaning, in the presence of a compound having a basic reaction, or preferably by reacting the dihalogeno-s-triazines of the formula 6 with the alkali metal salts of the aromatic dihydroxy compounds, according to processes which are in themselves known. The reaction is carried out either a. in an inert organic solvent or b. in an aqueous-alkaline phase or c. in a two-phase mixture of an inert organic solvent and an aqueous-alkaline phase at temperatures between 0° and 300°C, preferably between 30° and 150°C and using reaction times of between 0.2 and 20 hours, followed by direct reaction of the aromatic dihydroxy compounds, containing s-triazine rings, of the formula 8, which are formed as intermediates

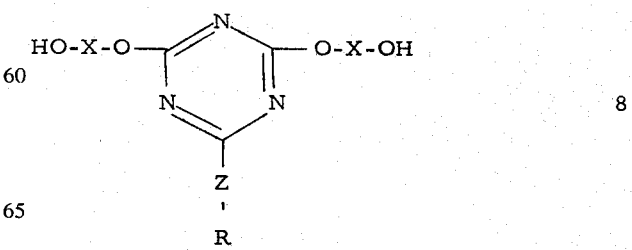
8 either by themselves or mixed with excess dihydroxy compound 7, depending on the choice of the molar ratio used in the reaction of the dihalogenotriazine with the dihydroxy compound 7, with polycarbonate-forming derivatives of carbonic acid, such as phosgene and/or the mono- and/or bis-chlorocarbonic acid esters of the aromatic dihydroxy compounds, optionally in the presence of chain stoppers, according to known processes for the manufacture of polycarbonates, and preferably according to the interfacial condensation process.

It is possible to use both different dihalogeno-s-triazines 6 and also different aromatic bis-hydroxy compounds 7 alongside one another, if a corresponding carbonate copolymer is desired. Furthermore, it is possible, without difficulty, to react the reaction products of dihalogeno-s-triazines with aromatic dihydroxy compounds with other bis-hydroxy compounds and polycarbonate-forming derivatives of carbonic acid.

The process according to the invention has the advantage that the manufacture of the bis-hydroxy compound, containing s-triazine, of the formula 8, and the subsequent manufacture of the homopolycarbonates or copolycarbonates, based on 8 and optionally other bis-hydroxy compounds, can be carried out in the same reaction medium and in the same reaction vessel, without isolation of the intermediate. Separate manufacture of the bisphenol containing s-triazine, while possible, is not necessary.

A particular variant for the manufacture of the high molecular polycarbonates according to the invention consists of carrying out the reaction of the dihalogeno-s-triazine of formula 6 with the bis-hydroxy compound of formula 7 in the presence of 0.01 to 5 mol percent of a trihalogeno-s-triazine, relative to the structural unit of the formula 1a, with Hal having the meaning indicated for formula 6 but preferably denoting Cl, so that the reaction mixture also contains, as intermediate products, trifunctional hydroxy compounds of the formula 8a

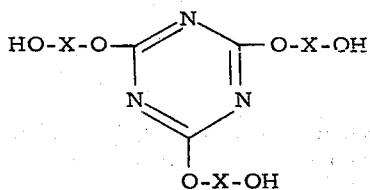

8a which in the subsequent reaction with polycarbonate-forming derivatives of carbonic acid cause a branching of the polycarbonates via s-triazine rings.

The dihalogeno-s-triazines used for the manufacture of the homopolycarbonates or copolycarbonates according to the invention, where they are not already known, are manufactured according to the processes known in the chemical literature.

For example, 2-alkylamino-, 2-arylamino-, 2-alkoxy-, 2-aroxy-, 2-alkylthio- and 2-arylthio-4,6-dichloro-s-triazines are obtained by reaction of cyanuric chloride with aliphatic or aromatic amines, alcohols, phenols, mercaptans and thiophenols [see, for example, J. R. Thurston and others, J. Am. Chem. Soc. 73 (1951), pages 2981 and 2990; H. Koopman and others, Rec. trav. chim. Pays-Bas 78 (1959), page 967].

For the manufacture of dihalogeno-s-triazines which are unsubstituted, or alkyl- or aryl-substituted, in the 2-position, see, for example, E. M. Smolin and L. Rapoport, The Chemistry of Heterocyclic Compounds, volume 13: "s-Triazines and Derivatives", Interscience Publishers Inc., New York (1959).

The following may be mentioned as examples of suitable dihalogeno-s-triazines of the formula 6: 2-methyl-4,6-dichloro-s-triazine, 2-ethyl-4,6-dichloro-s-triazine, 2-cyclohexyl-4,6-dichloro-s-triazine, 2-phenyl-4,6-dichloro-s-triazine, 2-methoxy-4,6-dichloro-s-triazine, 2-ethoxy-4,6-dichloro-s-triazine, 2-propoxy-4,6-dichloro-s-triazine, 2-isopropoxy-4,6-dichloro-s-triazine, 2-cyclohexyloxy-4,6-dichloro-s-triazine, 2-phenoxy-4,6-dichloro-s-triazine, 2-(2-methylphenoxy)-4,6-dichloro-s-triazine, 2-(3-methylphenoxy)-4,6-dichloro-s-triazine, 2-(4-methylphenoxy)-4,6-dichloro-s-triazine, 2-(2,6-dimethylphenoxy)-4,6-dichloro-s-triazine, 2-(4-tert.-butylphenoxy)-4,6-dichloro-s-triazine, 2-(2-chlorophenoxy)-4,6-dichloro-s-triazine, 2-(4-chlorophenoxy)-4,6-dichloro-s-triazine, 2-(2-bromophenoxy)-4,6-dichloro-s-triazine, 2-(4-bromophenoxy)-4,6-dichloro-s-triazine, 2-(2,4-dichlorophenoxy)-4,6-dichloro-s-triazine, 2-(2,6-dichlorophenoxy)-4,6-dichloro-s-triazine, 2-(2,4,6-trichlorophenoxy)-4,6-dichloro-s-triazine, 2-pentachlorophenoxy-4,6-dichloro-s-triazine, 2-pentabromophenoxy-4,6-dichloro-s-triazine, 2-(2-nitrophenoxy)-4,6-dichloro-s-triazine, 2-(4-nitrophenoxy)-4,6-dichloro-s-triazine, 2-(2,4,6-trinitrophenoxy)-4,6-dichloro-s-triazine, 2-(2-methoxyphenoxy)-4,6-dichloro-s-triazine, 2-(3-methoxyphenoxy)-4,6-dichloro-s-triazine, 2-(4-methoxyphenoxy)-4,6-dichloro-s-triazine, 2-methylmercapto-4,6-dichloro-s-triazine, 2-ethylmercapto-4,6-dichloro-s-triazine, 2-butylmercapto-4,6-dichloro-s-triazine, 2-cyclohexylmercapto-4,6-dichloro-s-triazine, 2-phenylthio-4,6-dichloro-s-triazine, 2-(4-methylphenylthio)-4,6-dichloro-s-triazine, 2-(2-methylphenylthio)-4,6-dichloro-s-triazine, 2-(4-chlorophenylthio)-4,6-dichloro-s-triazine, 2-(2,5-dichlorophenylthio)-4,6-dichloro-s-triazine, 2-pentachlorophenylthio-4,6-dichloro-s-triazine, 2-(2-nitrophenylthio)-4,6-dichloro-s-triazine, 2-amino-4,6-dichloro-s-triazine, 2-methylamino-4,6-dichloro-s-triazine, 2-ethylamino-4,6-dichloro-s-triazine, 2-propylamino-4,6-dichloro-s-triazine, 2-isopropylamino-4,6-dichloro-s-triazine, 2-n-hexylamino-4,6-dichloro-s-triazine, 2-n-dodecylamino-4,6-dichloro-s-triazine, 2-n-octadecylamino-4,6-dichloro-s-triazine, 2-dimethylamino-4,6-dichloro-s-triazine, 2-diethylamino-4,6-dichloro-s-triazine, 2-di-n-hexylamino-4,6-dichloro-s-triazine, 2-ethyleneimino-4,6-dichloro-s-triazine, 2-pyrrolidino-4,6-dichloro-s-triazine, 2-piperidino-4,6-dichloro-s-triazine, 2-morpholino-4,6-dichloro-s-triazine, 2-thiomorpholino-4,6-dichloro-s-triazine, 2-allylamino-4,6-dichloro-s-triazine, 2-diallylamino-4,6-dichloro-s-triazine, 2-anilino-4,6-dichloro-s-triazine, 2-o-toluidino-4,6-dichloro-s-triazine, 2-m-toluidino-4,6-dichloro-s-triazine, 2-p-toluidino-4,6-dichloro-s-triazine, 2-(2-chloroanilino)-4,6-dichloro-s-triazine, 2-(4-chloroanilino)-4,6-dichloro-s-triazine, 2-(4-bromoanilino)-4,6-dichloro-s-triazine, 2-(2,4-dichloroanilino)-4,6-dichloro-s-triazine, 2-(2-nitroanilino)-4,6-dichloro-s-triazine, 2-(3-nitroanilino)-4,6-dichloro-s-triazine, 2-(4-nitroanilino)-4,6-dichloro-s-triazine, 2-N-methylanilino-4,6-dichloro-s-triazine, 2-N-ethylanilino-4,6-dichloro-s-triazine, 2-diphenylamino- 4,6-dichloro-s-triazine, 2-(carbazolyl-9)-4,6-dichloro-s-triazine, 2-(phenothiazinyl-10)-4,6-dichloro-s-triazine, 2-(pyridyl-2)-amino-4,6-dichloro-s-triazine and 2-(pyrimidyl-2)-amino-4,6-dichloro-s-triazine.

Of course, numerous other dihalogeno-s-triazines can also be used as starting substances for polycarbonates containing s-triazine rings.

Examples of suitable aromatic dihydroxy compounds are: hydroquinone, resorcinol, 4,4'-dihydroxydiphenyl, bis-(hydroxy-phenyl)-alkanes, -cycloalkanes, -sulphides, -ethers, -ketones, -sulphoxides or -sulphones, and also α,α'-bis(hydroxyphenyl)-diisopropylbenzene as well as the corresponding nuclear-alkylated or nuclear-halogenated compounds.

Examples of some preferred aromatic dihydroxy compounds are: 2,2-bis-(4-hydroxyphenyl)-propane (bisphenol A), 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane, bis-(4-hydroxyphenyl)-methane, 1,1-bis-(4-hydroxyphenyl)-cyclohexane as well as trinuclear bisphenols, such as α,α'-bis-(4-hydroxyphenyl)-p-diisopropylbenzene.

These and further bisphenols suitable for the manufacture of the high molecular polycarbonates according to the invention are described in U.S. Pat. Nos. 2,970,131, 2,991,273, 2,999,835, 2,999,846, 3,014,891, 3,028,365, 3,062,781, 3,148,172, 3,271,367, 3,271,368, 3,280,078 and in DT-OS No. 1,570,703.

Suitable molecular weight stoppers are phenol and phenols with one or more substituents, but equally also mono-halogeno-s-triazines of the general formula 9

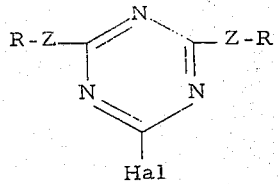

9 in which

Z, R and Hal have the meaning already given above.

The manufacture of the homopolycarbonates or copolycarbonates containing s-triazine rings, according to the invention, can be effected, for example, as follows:

The aromatic dihydroxy compound and two equivalents of an alkali hydroxide, preferably sodium hydroxide or potassium hydroxide, are dissolved in sufficient water to give an approximately 10% strength aqueous solution of the alkali metal salt of the bisphenol. Water-insoluble or sparingly soluble alkali metal salts of dihydroxy compounds are used as an aqueous suspension. It is also possible, without disadvantage, to use more dilute or more concentrated alkali metal salt solutions or suspensions. The desired amount of the dihalogeno-s-triazine, at most half an equivalent, but at least one-hundredth equivalent, relative to the bisphenol, is then added continuously (in portions) or in one portion, as a solution or suspension in a water-immiscible organic solvent which is inert, under the reaction conditions, towards the triazine derivative.

As organic solvents it is possible to use, for example, chlorinated hydrocarbons, such as $CH_2Cl_2$, $CHCl_3$, $CCl_4$, ethylene chloride and trichloroethylene, benzene, toluene, xylenes, chlorobenzene, dichlorobenzenes and more highly chlorinated aromatic compounds.

Since the reaction between the alkali metal salt of the bisphenol and the dihalogeno-s-triazine takes place principally at the interface between the organic solvent and the water, good mixing must be insured and this can be done in a manner which is in itself known, for example by vigorous stirring.

The well-mixed two-phase mixture is now kept at a temperature between 0° and 300°C, preferably between 30° and 150°C, for a period of 0.2 to 20 hours. As a rule, the condensation is complete after not more than five hours. The entire reaction up to that point is carried out under an inert gas atmosphere, preferably under nitrogen. The alkali metal salts, of the bisphenols, containing s-triazine rings, of the formula 8, which are formed, are more or less readily water-soluble depending on the nature of the dihalogeno-s-triazine used and on the nature of the aromatic dihydroxy compound used, so that after condensation has taken place either a suspension or an emulsion may be present, but this is not of decisive importance as regards the formation of the homopolycarbonates or copolycarbonates according to the invention.

If it is desired to prevent the occurrence of side-reactions between the aromatic dihydroxy compound and two molecules of the dihalogeno-s-triazine, with the formation of intermediate products of the formula 10

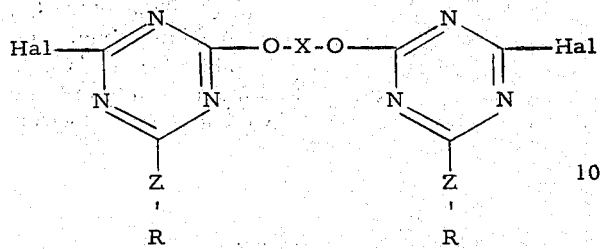

10 in which

X, Z, R and Hal have the abovementioned meaning, it is advantageous to choose a large excess of bisphenol and to carry out both the addition of the dihalogeno-s-triazine and the condensation at elevated temperature. However, the formation of the by-products of the formula 10 does not disturb the total course of the reaction since these compounds are also smoothly incorporated into the polycarbonate structure.

If desired, a solvent which is suitable for aromatic polycarbonates, such as methylene chloride, chloroform, carbon tetrachloride and 1,2-dichloroethane, or chlorinated aromatic compounds, such as dichlorobenzene, chlorotoluene or chlorobenzene, is added to the two-phase mixture in which possibly the alkali metal salts of the aromatic dihydroxy compound employed in excess, and the alkali metal salts of the bisphenol containing s-triazine, of the formula 8, are dissolved or suspended, and after addition of the molecular weight stoppers already mentioned above the reaction is carried out in an alkaline medium at a pH value of between 10 and 14, depending on the nature of the bisphenol components used, in a manner which is in itself known, with derivatives of carbonic acid which form carbonate groups, such as phosgene or mono- and/or bis-chlorocarbonic acid esters, or with precondensates of aromatic dihydroxy compounds, such as are described in patent specifications.

The homopolycarbonates or copolycarbonates, containing s-triazine rings manufactured according to the two-phase boundary process can be isolated in the customary manner, for example by acidifying the reaction mixture which has an alkaline reaction, separating off the aqueous phase, washing the organic phase with distilled water until it is free of electrolyte and precipitating the polycarbonate or distilling off the solvent.

The polymers thus obtained are low molecular or high molecular depending on the amount of added chain stopper.

The new high molecular polycarbonates containing s-triazine rings, according to the invention, are excellent thermoplastics with outstanding thermal, electrical and tough-elastic properties. They are distinguished, relative to the commercially available industrial polycarbonates from 2,2-bis-(4-hydroxyphenyl)-propane, by substantially improved stability to saponification by hot aqueous NaOH solutions, a raised softening point, and improved burning behavior. Thus, for example, copolycarbonates based on 2,2-bis-(4-hydroxyphenyl)-propane and dichloro-s-triazines, such as 2-diphenylamino-4,6-dichloro-s-triazine, from a content of only 5 percent by weight of s-triazine units upwards, meet the requirements of fire category SE I in the UL-test. The new polycarbonates according to the invention in general possess glass transition temperatures of above 160°C. They lend themselves very well to processing to give light-colored moldings, sheets and films. They can also be used very readily in mixtures with fillers, for example with minerals or carbon black, with substances producing special effects, or with glass fibers, pigments, dyestuffs, stabilizers and other additives. They can, in particularly be used with great advantage where, in addition to great toughness, improved resistance to hydrolysis and better burning behavior are desired or required. Of course, the high molecular polycarbonates containing s-triazine rings, according to the invention, can also be employed in all fields of use where conventional polycarbonates are used.

A particular advantage of the polycarbonates according to the invention is that it is possible to impart certain properties through the —Z—R grouping, such as, for example, compatibility with other polymers, mold release properties, the introduction of polar groups and solubility.

The invention is further illustrated but is not intended to be limited by the following examples in which all parts and percentages are by weight unless otherwise specified.

In the examples the burning behaviour is determined according UL, Sub. 94 (vertical test) with the ASTM-rod (one-sixteenth inch × one-half inch × 5 inch).

In the examples the N-content is determined according Kjeldahl (compare R. B. Bradstreet, Kjeldahl-method for organic nitrogen, Akademic Press, N.Y. London 1965).

In the examples the S-content and halogen-content is determined according Schöniger (compare W. Schoeninger, Micro Chimica Acta, Wien, 1955, page 123 and 1956 page 869).

EXAMPLE 1

Manufacture of a copolycarbonate from 2,2-bis-(4-hydroxyphenyl)-propane and 2-diphenylamino-4,6-dichloro-s-triazine (90:10 molar parts):

7.93 g (0.025 mol) of 2-diphenylamino-4,6-dichloro-s-triazine, dissolved in 150 ml of chlorobenzene, and 0.5 g of $NaBH_4$ are added to a solution of 51.4 g (0.225 mol) of 2,2-bis-(4-hydroxyphenyl)propane and 18 g (0.45 mol) of NaOH in 450 ml of water while simultaneously passing in a weak stream of nitrogen. The well-stirred mixture is heated for 5 hours under reflux (about 90°C). After cooling to room temperature, 300 ml of methylene chloride are added, the pH is adjusted to 13 by adding 22.5 ml of 2 N NaOH solution and 29.7 g (0.3 mol) of $COCl_2$ are introduced over the course of about 30 minutes at 17 to 21°C, with vigorous stirring. During the phosgenation, the pH value is kept constant by dropwise addition of 45% strength NaOH. In total, 15.6 ml of 45% strength NaOH are consumed. After addition of 12 ml of 1% strength aqueous triethylamine solution (0.53 mol per cent relative to bisphenol A) and 4.2 ml of 45% strength NaOH, condensation is continued for a further hour at pH 13.

The organic phase, which contains the polycarbonate containing s-triazine, is separated off, washed twice with dilute phosphoric acid and then with distilled water until free of electrolyte (conductivity $<10^{-5}\ \Omega^{-1}$ $cm^{-1}$) treated with acetone until it is slightly cloudy and added dropwise to methanol, whereupon the polymer precipitates as a white flocculent material.

After drying for 24 hours at 120°C in a waterpump vacuum, 58.2 g (93%) of polycarbonate containing s-triazine are obtained.

The relative viscosity (0.5 g of product in 100 ml of $CH_2Cl_2$ at 25°C) is 2.158.

Average molecular weight from light scattering measurements: $\overline{M}_{LS} = 188,500$.

N-content: calculated: 2.24% — found: 2.25%.

Colorless, transparent films can be spread using the $CH_2Cl_2$ solution. Measurements on films (thickness about 50 μm) gave the following data:

Tensile strength: 708 kp/cm$_2$
Elongation at break: 134%
E-modulus from tensile test: 23,100 kp/cm$^2$
Glass transition temperature (from torsional vibration experiment): 171°C.

EXAMPLE 2

Manufacture of a polycarbonate from 2,2-bis-(4-hydroxyphenyl)-propane and 2-diphenylamino-4,6-dichloro-s-triazine (2 : 1 molar parts):

Analogously to Example 1, 41.1 g (0.18 mol) of 2,2-bis-(4-hydroxyphenyl)-propane, 14.4 g (0.36 mol) of NaOH and 28.5 g (0.09 mol) of 2-diphenylamino-4,6-dichloro-s-triazine are reacted, in a solvent mixture of 450 ml of water and 150 ml of chlorobenzene, with the addition of 0.4 g of $NaBH_4$, for five hours at the reflux temperature; after cooling to room temperature and addition of 300 ml of $CH_2Cl_2$, 14.9 g (0.15 mol) of $COCl_2$ are passed in over the course of 30 minutes at pH 13 and about 20°C (consumption of NaOH: 6 ml of 45% strength NaOH), and finally, after adding 6 ml of 1% strength aqueous triethylamine solution (0.33 mol per cent relative to bisphenol A) condensation is continued for one hour at pH 13 and the mixture is worked up. Yield: 60 g (92%) of polymer.

$\eta_{rel} = 1.487$ (0.5 g of product in 100 ml of $CH_2Cl_2$ at 25°C)

$\overline{M}_{LS} = 69,700$

N-content: calculated: 7.7% — found: 7.6%.

The following data were determined on an approx. 60 μm thick film: Tensile strength: 738 kp/cm²

Elongation at break: 26%

E-modulus from tensile test: 27,700 kp/cm²

Glass transition temperature (from torsional vibration experiment): 190°C.

EXAMPLE 3

Manufacture of a copolycarbonate from 2,2-bis-(4-hydroxyphenyl)-propane and 2-diphenylamino-4,6-dichloro-s-triazine (80:20 molar parts), with chain stopper:

Analogously to Example 1, 2.22 kg (9.72 mols) of 2,2-bis-(4-hydroxyphenyl)-propane, 0.8 kg (20 mols) of NaOH and 0.77 kg (2.43 mols) of 2-diphenylamino-4,6-dichloro-s-triazine are reacted in a solvent mixture of 21 liters of water and 6.5 liters of chlorobenzene, with the addition of 22 g of $NaBH_4$, for 7 hours at the reflux temperature. After cooling to room temperature, 13 liters of $CH_2Cl_2$ and 26.3 g (0.175 mol) of p-tert.-butylphenol are added, 1.19 kg (12 mols) of $COCl_2$ are passed in over the course of 45 minutes at 25°C and after adding 500 ml of 1% strength aqueous triethylamine solution (0.51 mol per cent relative to bisphenol A), condensation is continued for one hour at pH 13. A total of 1.1 liters of 45% strength NaOH is consumed in order to keep the pH value constant during the phosgenation and post-condensation. The organic phase is diluted with 20 liters of $CH_2Cl_2$ and 20 liters of $H_2O$, washed twice with 2% strength $H_3PO_4$ and then with distilled water until free of electrolyte and subsequently worked up by adding chlorobenzene and distilling off the methylene chloride. The chlorobenzene solution gels on cooling and is converted, in a granulating machine, into a powder-granule mixture, which is dried for 66 hours at 120°C in a waterpump vacuum.

Yield: 2.86 kg (95.4%) of polycarbonate $\eta_{rel} = 1.291$ (0.5 g of product in 100 ml of $CH_2Cl_2$ at 25°C)

Average molecular weight by membrane osmosis: $\overline{M}_{OS} = 21,300$ $\overline{M}_{LS} = 50,300$ N-content: calculated: 4.53% — found: 4.32%.

The product can be readily processed on an extruder at 280°C. The following data were measured on colorless transparent injection moldings:

Elongation at break: $\epsilon_R = 74\%$

Tensile strength: $\sigma_R = 905$ kp/cm²

E-modulus from tensiletest: 25,400 kp/cm²

Impact strength: no breakage

Heat distortion point according to Vicat (DIN 53,460 B): 158°C $O_2$ index: 32%

Burning behaviour according to UL, Subj. 94: Class SE I

Glass transition temperature (from torsional vibration experiment): 180°C.

EXAMPLE 4

Manufacture of copolycarbonate from 2,2-bis-(4-hydroxyphenyl)-propane and 2-diphenylamino-4,6-dichloro-s-triazine (85 : 15 molar parts) with chain stopper:

Analogously to Example 3, 2.34 kg (10.25 mols) of 2,2-bis-(4-hydroxyphenyl)-propane, 820 g (20.5 mols) on NaOH and 571 g (1.8 mols) of 2-diphenylamino-4,6-dichloro-s-triazine are reacted in a solvent mixture of 20.5 liters of $H_2O$ and 6.5 liters of chlorobenzene, in the presence of 23 g of $NaBH_4$, for 4 hours at the reflux temperature. Thereafter, 14.5 liters of $CH_2Cl_2$ and 21.6 g (0.144 mol) of p-tertiary-butylphenol are added, 1.256 kg (12.7 mols) of $COCl_2$ are passed in, 513 ml of 1% strength aqueous triethylamine solution (about 0.48 mol per cent relative to bisphenol A) are added, and the mixture is reacted to give the polycarbonate.

Yield: 2.85 kg (95%)

$\eta_{rel} = 1.355$ (0.5 g of product 100 ml of $CH_2Cl_2$, 25°C.)

The following data were determined on moldings:

Elongation at break: $\epsilon_R = 80\%$

Impact strength: no breakage

Limiting flexural stress: 1,102 kp/cm²

Heat distortion point according to Vicat (DIN 53,460 B): 159°C

Glass transition temperature (from torsional vibration experiment): 173°C.

EXAMPLE 5

Manufacture of a copolycarbonate from 2,2-bis-(4-hydroxyphenyl)-propane and 2-diphenylamino-4,6-dichloro-s-triazine (90:10 molar parts), with chain stopper:

Analogously to Example 3, 1.538 kg (6.75 mols) of 2,2-bis-(4-hydroxyphenyl)-propane, 556 g (13.9 mols) of NaOH and 237.8 g (0.75 mol) of 2-diphenylamino-4,6-dichloro-s-triazine are reacted in a mixture of 14.7 liters of $H_2O$ and 4.5 liters of chlorobenzene, with the addition of 15 g of $NaBH_4$, for 4.5 hours. After addition of 9 liters of $CH_2Cl_2$ and 20.3 g (0.135 mol) of p-tert.-butylphenol, 817.5 g (8.27 mols) of $COCl_2$ are passed in and finally, after adding 360 ml of 1% strength aqueous triethylamine solution (0.53 mol per cent relative to bisphenol A), the condensation is completed.

After working up, 1.75 kg (93%) of copolycarbonate result.

$\eta_{rel} = 1.329$ (0.5 g of product in 100 ml of $CH_2Cl_2$, 25°C)

$\overline{M}_{LS} = 45,200$

The following data were determined on moldings:

Standard notched impact strength: 10.7 cmkp/cm²

Limiting flexural stress: 1,071 kp/cm²

Burning behavior according to UL Subj. 94: Class SE I

Glass transition temperature (torsional vibration experiment): 171°C.

EXAMPLE 6

Manufacture of a copolycarbonate from 2,2-bis-(4-hydroxyphenyl)-propane and 2-diphenylamino-4,6-dichloro-s-triazine (95 : 5 molar parts), with chain stopper:

Analogously to Example 1, 217 g (0.95 mol) of 2,2-bis-(4-hydroxyphenyl)-propane, 76 g (1.9 mols) of NaOH and 15.85 g (0.05 mols) of 2-diphenylamino-4,6-dichloro-s-triazine, in a two-phase mixture of 2.2 liters of water and 200 ml of chlorobenzene, are heated, with addition of 2 g of $NaBH_4$, for 4 hours under reflux. After cooling to room temperature, 1.5 liters of $CH_2Cl_2$ and 1.43 g (0.0095 mol) of p-tert.-butylphenol as the chain stopper are added, 124 g (1.25 mols) of $COCl_2$ are then introduced over the course of 45 minutes at pH 13 and 25°C, 57 ml of 1% strength aqueous triethylamine solution (0.6 mol per cent relative to bisphenol A) are added and in order to complete the polycondensation, the mixture is stirred for a further hour. A total of 350 ml of 2 N NaOH are consumed for maintaining the pH value of 13 during the phosgenation and post-condensation. After precipitation according to Example 1, 227 g (90%) of polycondensate of relative viscosity: $\eta_{rel}$ = 1.545 (0.5 g of product in 100 ml of $CH_2Cl_2$, 25°C) result.

The following data were determined on moldings:
Tensil strength: $\sigma_R$ = 704 kp/cm$^2$
Elongation at break: $\epsilon_R$ = 86%
E-modulus from tensile test: 26,000 kp/cm$^2$
$O_2$ index: 32%
Glass transition temperature (from torsional vibration experiment): 161°C.

EXAMPLE 7

Resistance of the copolycarbonates manufactured in Examples 3 to 5 towards 10% strength aqueous sodium hydroxide solution at the reflux temperature:

Weight decrease of Buchmann rods after boiling for 100 hours in 10% strength sodium hydroxide solution; before weighing, the moldings were washed with water and dried in vacuo (15 mm Hg) at 120°C for 100 hours.

| Product | Amount Weighed Out (mg) | Weight Loss (%) |
| --- | --- | --- |
| Bisphenol-A homopolycarbonate | 3,368 | 100 |
| From Example 3 | 3,465 | 7.1 |
| From Example 4 | 3,450 | 9.3 |
| From Example 5 | 3,437 | 11.8 |

EXAMPLE 8

Manufacture of a copolycarbonate from 2,2-bis-(4-hydroxyphenyl)-propane and 2-phenyl-4,6-dichloro-s-triazine (86 : 14 molar parts):

Analogously to Example 1, 28.55 g (0.125 mol) of 2,2-bis-(4-hydroxyphenyl)-propane, 10 g (0.25 mol) of NaOH and 4.6 g (20.35 mmols) of 2-phenyl-4,6-dichloro-s-triazine are reacted in a two-phase mixture of 296 ml of water and 76 ml of chlorobenzene for 4 hours at the reflux temperature. After cooling to 25°C, 135 ml of $CH_2Cl_2$ are added and 13.3 g (0.134 mol) of $COCl_2$ are passed into the well-mixed emulsion over the course of 55 minutes at pH 13, finally 10.4 ml of 1% strength aqueous triethylamine solution (about 0.8 mol per cent relative to bisphenol A) are added and condensation is continued for a further hour. NaOH consumption (45% strength) for keeping the pH constant at 13 = 6 ml.

The polymer is worked up analogously to Example 1.
Yield: 32 g (93%) of copolycarbonate
$\eta_{rel}$ = 2.240 (0.5 g of product in 100 ml of $CH_2Cl_2$, 25°C)
N-content: calculated: 2.49% — found: 2.45%
$\overline{M}_{LS}$ = 205,000
Glass transition temperature (from differential thermoanalysis, DTA): 166°C.

EXAMPLE 9

Manufacture of a copolycarbonate from 2,2-bis-(4-hydroxyphenyl)-propane and 2-morpholino-4,6-dichloro-s-triazine (86 : 14 molar parts), with chain stopper:

Analogously to Example 1, 20.5 g (0.09 mol) of 2,2-bis-(4-hydroxyphenyl)-propane, 7.2 g (0.18 mol) of NaOH and 3.52 g of a mixture of 98 per cent by weight of 2-morpholino-4,6-dichloro-s-triazine (14.7 mmols) and 2 per cent by weight of 2,4-bismorpholino-6-chloro-s-triazine (2.45 × 10$^{-4}$ mol), in a two-phase mixture of 180 ml of water and 60 ml of chlorobenzene, are reacted, with addition of 0.2 g of $NaBH_4$, for 4 hours at the reflux temperature. After cooling to 25°C, 120 ml of $CH_2Cl_2$ are added and 10.9 g (0.11 mol) of $COCl_2$ are passed into the well-mixed emulsion over the course of 13 minutes at pH 13, finally 4.8 ml of 1% strength aqueous triethylamine solution (about 0.53 mol per cent relative to bisphenol A) are added and the mixture is condensed for a further hour. NaOH consumption (45% strength) for maintaining a pH of 13 = 5 ml.

After precipitation, 23.7 g (95%) of flocculent white polycarbonate are obtained.

$\eta_{rel}$ = 1.294 (0.5 g of product in 100 ml of $CH_2Cl_2$, 25°C)
N-content: calculated: 3.3% — found: 3.4%
Glass transition temperature (DTA): 160°C.

EXAMPLE 10

Manufacture of a copolycarbonate from 2,2-bis-(4-hydroxyphenyl)-propane and 2-n-dodecylamino-4,6-dichloro-s-triazine (92 : 8 molar parts):

Analogously to Example 1, 30.8 g (0.135 mol) of 2,2-bis-(4-hydroxyphenyl)-propane, 10.8 g (0.27 mol) of NaOH and 3.9 g (11.7 mmols) of 2-n-dodecylamino-4,6-dichloro-s-triazine, in a two-phase mixture of 260 ml of water and 87 ml of chlorobenzene, are heated, with addition of 0.3 g of $NaBH_4$, for 4 hours at the boil. After cooling to 20°C, 175 ml of $CH_2Cl_2$ are added and 17.8 g (0.18 mol) of $COCl_2$ are passed into the well-mixed emulsion over the course of 30 minutes at 18° to 24°C and pH 13, 7.3 ml of 1% strength aqueous triethylamine solution (about 0.54 mol per cent relative to bisphenol A) are then added and condensation is continued for 1 hour. NaOH consumption (45% strength) for maintaining a pH of 13 = 7 ml.

After precipitation, 34 g (92%) of white, flocculent polycarbonate are obtained.

$\eta_{rel}$ = 2.161 (0.5 g of product in 100 ml of $CH_2Cl_2$, 25°C)
N-content: calculated: 1.78% — found: 1.73%
The following data was determined on an approx. 60 μm thick, colorless transparent flim:
Tensile strength: $\sigma_R$ = 788 kp/cm$^2$
Elongation at break: $\epsilon_R$ = 113%
E-modulus from tensile test: 25,900 kp/cm$^2$
Glass transition temperature (from torsional vibration experiment): 144°C.

EXAMPLE 11

Manufacture of a copolycarbonate from 2,2-bis-(4-hydroxyphenyl)-propane and 2-methylmercapto-4,6-dichloro-s-triazine (88.5 : 11.5 molar parts):

Analogously to Example 1, 20.2 g (88.5 mmols) of 2,2-bis-(4-hydroxyphenyl)-propane, 7.1 g (178 mmols)

of NaOH and 2.26 g (11.5 mmols) of 2-methylmercapto-4,6-dichloro-s-triazine, in a mixture of 160 ml of $H_2O$ and 60 ml of chlorobenzene, are reacted for 4 hours at the reflux temperature. Thereafter, 100 ml of $CH_2Cl_2$ are added, 9.9 g (0.1 mol) of $COCl_2$ are passed in and after adding 7.5 ml of 1% strength aqueous triethylamine solution the mixture is stirred for a further hour and worked up by precipitation in $CH_3OH$.

Yield: 23 g (98%) of polycarbonate $\eta_{rel} = 1.814$ (0.5 g of product in 100 ml of $CH_2Cl_2$, 25°C)

S-content: calculated: 1.58% — found: 1.58%
N-content: calculated: 2.07% — found: 2.02%

EXAMPLE 12

Manufacture of a copolycarbonate from 2,2-bis-(4-hydroxyphenyl)-propane and 2-anilino-4,6-dichloro-s-triazine (80 : 20 molar parts):

Analogously to Example 1, 19.7 g (86.4 mmols) of 2,2-bis-(4-hydroxyphenyl)-propane, 7 g (175 mmols) of NaOH and 5.2 g (21.6 mmols) of 2-anilino-4,6-dichloro-s-triazine, in a mixture of 180 ml of $H_2O$ and 60 ml of chlorobenzene, are reacted for 4 hours at the reflux temperature. 120 ml of $CH_2Cl_2$ are then added at room temperature, 9.9 g (0.1 mol) of $COCl_2$ are passed in and after adding 4 ml of 1% strength aqueous triethylamine solution the mixture is stirred for a further hour and worked up.

Yield: 24 g (96%) of copolycarbonate $\eta_{rel} = 1.584$ (0.5 g of product in 100 ml of $CH_2Cl_2$, 25°C)

N-content: calculated: 4.83% — found: 4.73%.

EXAMPLE 13

Manufacture of a copolycarbonate from 2,2-bis-(4-hydroxyphenyl)-propane and 2-diethylamino-4,6-dichloro-s-triazine (85.7 : 14.3 molar parts):

Analogously to Example 1, 20.8 g (91.2 mmols) of 2,2-bis-(4-hydroxyphenyl)-propane, 7.3 g (182.5 mmols) of NaOH and 3.36 g (15.2 mmols) of 2-diethylamino-4,6-dichloro-s-triazine, in a two-phase mixture of 180 ml of water and 60 ml of chlorobenzene, are reacted for 4 hours at the reflux temperature. Thereafter, 120 ml of $CH_2Cl_2$ are added at 25°C, 11.3 g (114 mmols) of $COCl_2$ are passed in and after adding 4.6 ml of 1% strength aqueous triethylamine solution the mixture is stirred for a further hour.

Yield: 23.8 g (95%) of copolycarbonate $\eta_{rel} = 1.468$ (0.5 g of product in 100 ml of $CH_2Cl_2$, 25°C)

N-content: calculated: 3.40% — found: 3.41%.

EXAMPLE 14

Manufacture of a copolycarbonate from 2,2-bis-(4-hydroxyphenyl)-propane and 2-tert.-butylamino-4,6-dichloro-s-triazine (85.7 : 14.3 molar parts) with chain stopper:

Analogously to Example 1, 20.8 g (91.2 mmols) of 2,2-bis-(4-hydroxyphenyl)-propane, 7.3 g (182.5 mmols) of NaOH and 3.36 g (15.2 mmols) of 2-tert.-butylamino-4,6-dichloro-s-triazine, in a two-phase mixture of 180 ml of $H_2O$ and 60 ml of chlorobenzene, are reacted, with addition of 0.2 g of $NaBH_4$, for 4 hours at the reflux temperature. 120 ml of $CH_2Cl_2$ and 0.137 g (0.912 mmols) of p-tert.-butylphenol are then added at 20 to 25°C, 11.3 g (114 mmols) of $COCl_2$ are passed in and after adding 4.6 ml of triethylamine solution (1% strength) the mixture is stirred for a further hour.

Yield: 24.3 g (97%) of copolycarbonate $\eta_{rel} = 1.318$ (0.5 g of product in 100 ml of $CH_2Cl_2$, 25°C)

N-content: calculated: 3.40% — found: 3.38%.

EXAMPLE 15

Manufacture of a copolycarbonate from 2,2-bis-(4-hydroxyphenyl)-propane and 2-thiomorpholino-4,6-dichloro-s-triazine (90 : 10 molar parts):

Analogously to Example 1, 20.5 g (0.09 mol) of 2,2-bis-(4-hydroxyphenyl)-propane, 7.2 g (0.18 mol) of NaOH and 2.51 g (0.01 mol) of 2-thiomorpholino-4,6-dichloro-s-triazine, in a solvent mixture of 180 ml of $H_2O$ and 60 ml of chlorobenzene, are reacted for 4 hours at the reflux temperature. 120 ml of $CH_2Cl_2$ are then added at 20° to 25°C, 12.9 g (0.13 mol) of $COCl_2$ are passed in and after adding 5 ml of 1% strength aqueous triethylamine solution the mixture is stirred for a further hour and worked up by evaporating the $CH_2Cl_2$ solution.

Yield: 24 g (98%)

$\eta_{rel} = 1.293$ (0.5 g of polycarbonate in 100 ml of $CH_2Cl_2$, 25°C)

N-content: calculated: 2.30% — found: 2.28%.

EXAMPLE 16

Manufacture of a copolycarbonate from 2,2-bis-(4-hydroxyphenyl)-propane and 2-methyl-4,6-dichloro-s-triazine (90:10 molar parts):

Analogously to Example 15, 20.5 g (0.09 mol) of 2,2-bis-(4-hydroxyphenyl)-propane and 1.61 g (0.01 mol) of 2-methyl-4,6-dichloro-s-triazine are reacted and converted by means of 12.9 g (0.12 mol) of $COCl_2$ into the polycarbonate.

Yield: 22.3 g (95%)

$\eta_{rel} = 1.408$ (0.5 g of polycarbonate in 100 ml of $CH_2Cl_2$, 25°C)

N-content: calculated: 1.79% — found: 1.70%.

EXAMPLE 17

Manufacture of a copolycarbonate from 2,2-bis-(4-hydroxyphenyl)-propane and 2-phenylthio-4,6-dichloro-s-triazine (90 : 10 molar parts):

Analogously to Example 15, 20.5 g (0.09 mol) of 2,2-bis-(4-hydroxyphenyl)-propane and 2.58 g (0.01 mol) of 2-phenylthio-4,6-dichloro-s-triazine are reacted and converted, by means of 12.9 g (0.13 mol) of $COCl_2$ into the polycarbonate.

Yield: 23.6 g (97%)

$\eta_{rel} = 1.285$ (0.5 g of polycarbonate in 100 ml of $CH_2Cl_2$, 25°C)

N-content: calculated: 1.73% — found: 1.70%.

EXAMPLE 18

Manufacture of a copolycarbonate from 2,2-bis-(4-hydroxyphenyl)-propane and 2-n-octadecylamino-4,6-dichloro-s-triazine (90 : 10 molar parts):

Analogously to Example 15, 20.5 g (0.09 mol) of 2,2-bis-(4-hydroxyphenyl)-propane and 4.17 g (0.01 mol) of 2-n-octadecylamino-4,6-dichloro-s-triazine are reacted and then converted, by means of 12.9 g (0.13 mol) of $COCl_2$, into the polycarbonate.

Yield: 25.2 g (97%)

$\eta_{rel} = 1.882$ (0.5 g of product in 100 ml of $CH_2Cl_2$, 25°C)

N-content: calculated: 2.16% — found: 2.11%.

EXAMPLE 19

Manufacture of a copolycarbonate from 2,2-bis-(4-hydroxyphenyl)-propane and 2-cyclohexylamino-4,6-dichloro-s-triazine (90 : 10 molar parts):

Analogously to Example 15, 20.5 g (0.09 mol) of 2,2-bis-(4-hydroxyphenyl)-propane and 2.47 g (0.01 mol) of 2-cyclohexylamino-4,6-dichloro-s-triazine are reacted and converted, by means of 12.9 g (0.13 mol) of $COCl_2$, into the polycarbonate.

Yield: 23.8 g (98%)

$\eta_{rel}$ = 2.106 (0.5 g of product in 100 ml of $CH_2Cl_2$, 25°C)

N-content: calculated: 2.30% — found: 2.32 %.

EXAMPLE 20

Manufacture of a copolycarbonate from 2,2-bis-(4-hydroxyphenyl)-propane and 2-cyclohexyl-4,6-dichloro-s-triazine (90 : 10 molar parts):

Analogously to Example 15, 20.5 g (0.09 mol) of 2,2-bis-(4-hydroxyphenyl)-propane and 2.32 g (0.01 mol) of 2-cyclohexyl-4,6-dichloro-s-triazine are reacted and converted, by means of 12.9 g (0.13 mol) of $COCl_2$, into the polycarbonate.

Yield: 23 g (95

$\eta_{rel}$ = 1.688 $Cl_2$, 25°

$\eta_{rel}$ =1.560 (0.5 g of product in 100 ml of $CH_2Cl_2$, 25°C)

N-content: calculated: 1.73% — found: 1.72%.

EXAMPLE 21

Manufacture of a copolycarbonate from 2,2-bis-(4-hydroxyphenyl)-propane and 2-(carbazolyl-9)-4,6-dichloro-s-triazine (90 : 10 molar parts):

Analogously to Example 15, 20.5 g (0.09 mol) of 2,2-bis-(4-hydroxyphenyl)-propane and 3.15 g (0.01 mol) of 2-(carbazolyl-9)-4,6-dichloro-s-triazine are reacted and converted, by means of 12.9 g (0.13 mol) of $COCl_2$, into the polycarbonate.

Yield: 24.2 g (93%) $\eta_{rel}$ = 1.688 (0.5 g of polycarbonate in 100 ml of $CH_2Cl_2$, 25°C)

N-content: calculated: 2.24% — found: 2.20%.

EXAMPLE 22

Manufacture of a copolycarbonate from 2,2-bis-(4hydroxyphenyl)-propane and 2-(phenothiazinyl-10)-4,6-dichloro-s-triazine (90 : 10 molar parts):

Analogously to Example 15, 20.5 g (0.09 mol) of 2,2-bis-(4-hydroxyphenyl)-propane, 3.47 g (0.01 mol) of 2-(phenothiazinyl-10)-4,6-dichloro-s-triazine and 12.9 g (0.13 mol) of $COCl_2$ are reacted to give a copolycarbonate.

Yield: 24 g (95%)

$\eta_{rel}$ = 1.429 (0.5 g of product in 100 ml of $CH_2Cl_2$, 25°C)

N-content: calculated: 2.22% — found: 2.18%.

EXAMPLE 23

Manufacture of a copolycarbonate from 2,2-bis-(4-hydroxyphenyl)-propane and 2-piperidino-4,6-dichloro-s-triazine (90 : 10 molar parts):

Analogously to Example 15, 20.5 g (0.09 mol) of 2,2-bis-(4-hydroxyphenyl)-propane, 2.33 g (0.01 mol) of 2-piperidino-4,6-dichloro-s-triazine and 12.9 g (0.13 mol) of $COCl_2$ are reacted to give a copolycarbonate.

Yield: 23.4 g (97%)

$\eta_{rel}$ = 2.225 (0.5 g of copolycarbonate in 100 ml of $CH_2Cl_2$, 25°C)

N-content: calculated: 2.32% — found: 2.30%.

EXAMPLE 24

Manufacture of a copolycarbonate from 2,2-bis-(4-hydroxyphenyl)-propane and 2-diallylamino-4,6-dichloro-s-triazine (90 : 10 molar parts):

Analogously to Example 15, 20.5 g (0.09 mol) of 2,2-bis-(4-hydroxyphenyl)-propane, 2.46 g (0.01 mol) of 2-diallylamino-4,6-dichloro-s-triazine and 2.9 g (0.13 mol) of $COCl_2$ are reacted to give a copolycarbonate.

Yield: 23.8 g (98%)

$\eta_{rel}$ = 1.375 (0.5 g of polycarbonate in 100 ml of $CH_2Cl_2$, 25°C)

N-content: calculated: 2.30% — found: 2.27%

EXAMPLE 25

Manufacture of a copolycarbonate from 2,2-bis-(4-hydroxyphenyl)-propane and 2-(2,4,6-trichloroanilino)-4,6-dichloro-s-triazine (90 : 10 molar parts):

Analogously to Example 15, 20.5 g (0.09 mol) of 2,2-bis-(4-hydroxyphenyl)-propane, 3.44 g (0.01 mol) of 2-(2,4,6-trichloroanilino)-4,6-dichloro-s-triazine and 12.9 g (0.13 mol) of $COCl_2$ are reacted to give a copolycarbonate.

Yield: 24 g (95%)

$\eta_{rel}$ = 1.288 (0.5 g of polycarbonate in 100 ml of $CH_2Cl_2$, 25°C)

N-content: calculated: 1.67% — found: 1.68%
Cl-content: calculated: 4.21% — found: 4.15%.

EXAMPLE 26

Manufacture of a copolycarbonate from 2,2-bis-(4-hydroxyphenyl)-propane and 2-(2,5-dichlorophenylthio)-4,6-dichloro-s-triazine (90 : 10 molar parts):

Analogously to Example 15, 20.5 g (0.09 mol) of 2,2-bis-(4-hydroxyphenyl)-propane, 3.27 g (0.01 mol) of 2-(2,5-dichlorophenylthio)-4,6-dichloro-s-triazine and 12.9 g (0.13 mol) of $COCl_2$ are reacted to give a copolycarbonate.

Yield: 24 g (96%)

$\eta_{rel}$ = 1.653 (0.5 g of product in 100 ml of $CH_2Cl_2$, 25°C)

N-content: calculated: 1.68% — found: 1.67'
S-content: calculated: 1.28% — found: 1.30%.

EXAMPLE 27

Manufacture of a copolycarbonate from 2,2-bis-(4-hydroxyphenyl)-propane and 2-(3-nitroanilino)-4,6-dichloro-s-triazine (90 : 10 molar parts):

Analogously to Example 15, 20.5 g (0.09 mol) of 2,2-bis-(4-hydroxyphenyl)-propane, 2.86 g (0.01 mol) of 2-(3-nitroanilino)-4,6-dichloro-s-triazine and 12.9 g (0.13 mol) of $COCl_2$ are reacted to give a copolycarbonate.

Yield: 24 g (97%)

$\eta_{rel}$ = 1.490 (0.5 g of product in 100 ml of $CH_2Cl_2$, 25°C)

N-content: calculated: 2.84% — found: 2.80%.

EXAMPLE 28

Manufacture of a copolycarbonate from 2,2-bis-(4-hydroxyphenyl)-propane and 2-(N-methylanilino)-4,6-dichloro-s-triazine (90 : 10 molar parts):

Analogously to Example 15, 20.5 g (0.09 mol) of 2,2-bis-(4-hydroxyphenyl)-propane, 2.55 g (0.01 mol) of 2-(N-methylanilino)-4,6-dichloro-s-triazine and 12.9 g (0.13 mol) of $COCl_2$ are reacted to give a copolycarbonate.

Yield: 23.6 (97%)

$\eta_{rel}$ = 1.923 (0.5 g of polycarbonate in 100 ml of $CH_2Cl_2$, 25°C)

N-content: calculated: 2.30% — found: 2.30%.

EXAMPLE 29

Manufacture of a copolycarbonate from 2,2-bis-(4-hydroxyphenyl)-propane and 2-benzylamino-4,6-dichloro-s-triazine (90 : 10 molar parts):

Analogously to Example 15, 20.5 g (0.09 mol) of 2,2-bis-(4-hydroxyphenyl)-propane, 2.55 g (0.01 mol) of 2-benzylamino-4,6-dichloro-s-triazine and 12.9 g (0.13 mol) of $COCl_2$ are reacted to give a copolycarbonate.

Yield: 23.4 g (96%)

$\eta_{rel}$ = 1.728 (0.5 g of product in 100 ml of $CH_2Cl_2$, 25°C)

N-content: calculated: 2.30% — found: 2.31%.

EXAMPLE 30

Manufacture of a branched copolycarbonate from 2,2-bis-(4-hydroxyphenyl)-propane, 2-diphenylamino-4,6-dichloro-s-triazine (90 : 10 molar parts) and cyanuric chloride (0.3 mol percent);

Analogously to Example 1, 20.5 g (0.09 mol) of 2,2-bis-(4-hydroxyphenyl)-propane, 7.2 g (0.18 mol) of NaOH, 3.17 g (0.01 mol) of 2-diphenylamino-4,6-dichloro-s-triazine and 0.05 g (0.27 mmol) of cyanuric chloride, in a two-phase mixture of 180 ml of $H_2O$ and 60 ml of chlorobenzene, are reacted for 4 hours at the reflux temperature. 120 ml of $CH_2Cl_2$ and 202.8 mg (1.35 mmols) of p-tert.-butylphenol are then added at room temperature, 11.8 g (0.12 mol) of $COCl_2$ are passed in and after adding 5 ml of 1% strength aqueous triethylamine solution the mixture is stirred for a further hour and worked up over chlorobenzene.

Yield: 24.2 g (97%) of branched polycarbonate $\eta_{rel}$ = 1.441 (0.5 g of polycarbonate in 100 ml of $CH_2Cl_2$, 25°C)

N-content: calculated: 2.24% — found: 2.25%.

EXAMPLE 31

Manufacture of a copolycarbonate from bis-(4-hydroxyphenyl)-methane and 2-diphenylamino-4,6-dichloro-s-triazine (90 : 10 molar parts):

Analogously to Example 15, 18.0 g (0.09 mol) of bis-(4-hydroxyphenyl)-methane, 3.17 g (0.01 mol) of 2-diphenylamino-4,6-dichloro-s-triazine and 12.9 g (0.13 mol) of $COCl_2$ are reacted to give a copolycarbonate.

Yield: 21.9 g (97%)

$\eta_{rel}$ = 2.003 (0.5 g of product in 100 ml of $CH_2Cl_2$, 25°C)

N-content: calculated: 2.48% — found: 2.34%.

EXAMPLE 32

Manufacture of a copolycarbonate from 2,2-bis-(3,5-dimethyl-4-hydroxyphenyl)-propane and 2-diphenylamino-4,6-dichloro-s-triazine (90 : 10 molar parts):

Analogously to Example 1, 25.6 g (0.09 mol) of 2,2-bis-(3,5-dimethyl-4-hydroxyphenyl)-propane are reacted with 3.17 g (0.01 mol) of 2-diphenylamino-4,6-dichloro-s-triazine for 6 hours at the reflux temperature, after addition of $CH_2Cl_2$ 19.8 g (0.2 mol) of $COCl_2$ are passed in and finally 1.36 g (13.5 mmols) of triethylamine are added and the mixture is stirred for a further 3 hours.

Yield: 29.5 g (98%) of polycarbonate $\eta_{rel}$ = 1.423 (0.5 g of product in 100 ml of $CH_2Cl_2$, 25°C)

N-content: calculated: 1.86% - found: 1.90%.

EXAMPLE 33

Manufacture of a copolycarbonate from 2,2-bis-(3,5-dichloro-4-hydroxyphenyl)-propane and 2-diphenylamino-4,6-dichloro-s-triazine (90 : 10 molar parts):

Analogously to Example 15, 33 g (0.09 mol) of 2,2-bis-(3,5-dichloro-4-hydroxyphenyl)-propane, 3.17 g (0.01 mol) of 2-diphenylamino-4,6-dichloro-s-triazine and 14.9 g (0.15 mol of $COCl_2$) are reacted to give a polycarbonate.

Yield: 36 g (96%)

$\eta_{rel}$ = 1.330 (0.5 g of product in 100 ml of $CH_2Cl_2$, 25°C)

N-content: calculated: 1.50% — found: 1.40%

Cl-content: calculated: 3.78% — found: 3.60%.

EXAMPLE 34

Manufacture of a copolycarbonate from $\alpha,\alpha'$-bis-(4-hydroxyphenyl)-diisopropylbenzene and 2-diphenylamino-4,6-dichloro-s-triazine (90 : 10 molar parts):

Analogously to Example 15, 31.2 g (0.09 mol) of $\alpha,\alpha'$-bis-(4-hydroxyphenyl)-diisopropylbenzene, 3.17 g (0.01 mol) of 2-diphenylamino-4,6-dichloro-s-triazine and 14.9 g (0.15 mol) of $COCl_2$ are reacted to give a copolycarbonate.

Yield: 34 g (95%)

$\eta_{rel}$ = 1.538 (0.5 g of product in 100 ml of $CH_2Cl_2$, 25°C)

N-content: calculated: 1.57% — found: 1.49%.

EXAMPLE 35

Manufacture of a copolycarbonate from 2,2-bis-(4-hydroxyphenyl)-propane and 2-(2,6-dimethylphenoxy)-4,6-dichloro-s-triazine (85.7 : 14.3 molar parts):

Analogously to Example 15, 20.5 g (0.09 mol) of 2,2-bis-(4-hydroxyphenyl)-propane and 4.05 g (0.15 mol) of 2-(2,6-dimethylphenoxy)-4,6-dichloro-s-triazine (manufactured according to known processes from cyanuric chloride and 2,6-dimethylphenol with addition of s-collidine as an HCl acceptor; melting point 115° to 117.5°C, from nhexane) are reacted and converted by means of 11.2 g (0.113 mol) of $COCl_2$ into a polycarbonate.

Yield: 24.4 g (96%)

$\eta_{rel}$ = 1.527 (0.5 g of polycarbonate in 100 ml of $CH_2Cl_2$, 25°C)

N-content: calculated: 2.48% — found: 2.30%.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. High molecular weight polycarbonates, based on aromatic bishydroxy compounds, consisting essentially of structural units of the following general formula

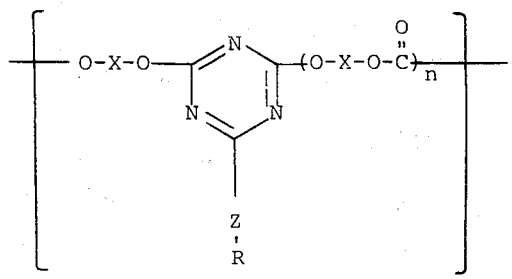

in which

X denotes an o-, m- or p-phenylene radical, an o-, m- or p-phenylene radical with one or more $C_1$-$C_4$ lower alkyl or halogen substitutents, or a radical of the formula

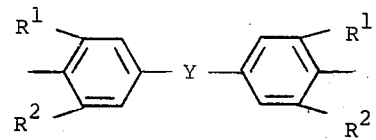

in which

R$^1$ and R$^2$ represent hydrogen atoms, alkyl radicals with 1 to 4 carbon atoms or halogen, and have identical or different meanings, Y denotes a single bond, an alkylene or alkylidene radical with 1 to 7 carbon atoms, a cycloalkylene or cycloalkylidene radical with 5 to 12 carbon atoms,

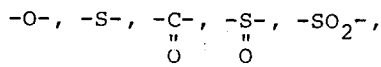

or a radical of the formulae:

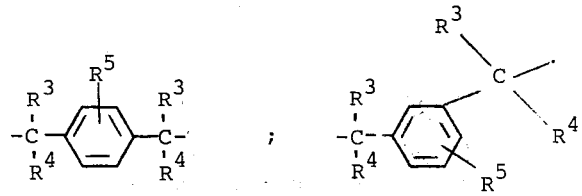

wherein

R$^3$ to R$^5$ denote alkyl radicals with 1 to 5 carbon atoms, but

R$^5$ can also represent halogen atoms,

Z represents a single bond, —O—, —S—, —NH— or —NR$^6$—,

R$^6$ denotes hydrogen, n-alkyl radicals with 1 to 30 carbon atoms or their isomers, n-alkenyl radicals with 2 to 30 carbon atoms or their isomers, cycloalkyl radicals with 5 to 12 carbon atoms, alkylsubstituted or alkenyl-substituted cycloalkyl radicals with 5–12 ring carbon atoms and 1 to 5 carbon atoms in the side-chain, mononuclear or polynuclear aryl or heteroaryl radicals with up to 14 carbon atoms, or aralkyl radicals with a total of up to 30 carbon atoms, or the aryl-carbon atom bonded halogen and/or $C_1$-$C_6$-alkyl and/or $C_1$-$C_6$-alkoxy and/or nitro-substituted derivatives of the aryl, heteroaryl or aralkyl radicals;

R has the same meaning as R$^6$, and is identical or not identical with R$^6$, and can be linked to R$^6$ via alkylene radicals with 2 to 5 carbon atoms which can be interrupted by hetero-atoms, such as O, S and NR$^7$, that is R + R$^6$ can be alkylene with 2 to 5 carbon atoms which can be interrupted by O, S and NR$^7$, with the proviso that the rings formed by R, Z and R$^6$ are from three- to six-membered rings; R$^7$ is an alkyl radical with 1 to 4 carbon atoms, a phenyl radical or an alkylaryl radical with a total of up to 10 carbon atoms, or R and R$^6$ can be aryl linked via a single bond or O or S, and n is an integer between 1 and 20 inclusive.

2. Polycarbonates according to claim 1, characterized in that

X denotes a radical characterized by the formula

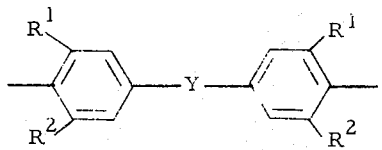

in which

R$^1$ and R$^2$ have the abovementioned meaning and

Y is an alkylene or alkylidene radical with 1 to 7 carbon atoms or a cycloalkylene or cycloalkylidene radical with 5 to 12 carbon atoms.

3. Polycarbonates according to claim 2, characterized in that X denotes

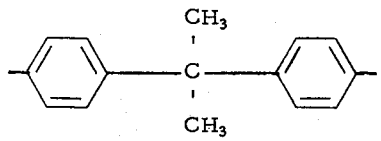

4. Polycarbonates according to claim 3, characterized in that Z = NR$^6$, R$^6$ = R = phenyl and $n$ = 1 to 20.

5. Polycarbonates according to claim 1 characterized in that Z denotes NR$^6$ and R$^6$ has the same meaning as indicated in claim 1.

6. Polycarbonates according to claim 1 characterized in that R$^6$ denotes hydrogen, n-alkyl radicals with 1 to 30 carbon atoms or their isomers, n-alkenyl radicals with 2 to 30 carbon atoms or their isomers, cycloalkyl radicals with 5 to 12 carbon atoms, alkyl-substituted or alkenyl-substituted cycloalkyl radicals with 5 – 12 ring carbon atoms and 1 to 5 carbon atoms in the side chain, mononuclear or polynuclear aryl or heteroaryl radicals with up to 14 carbon atoms or the aryl-carbon atom bonded halogen and/or $C_1$-$C_6$-alkyl and/or $C_1$-$C_6$-alkoxy and/or nitro substituted derivatives of the aryl or heteroaryl radicals.

7. Polycarbonates according to claim 6, characterized in that Z denotes NR$^6$.

8. Polycarbonates according to claim 7 characterized in that R has the same meaning as R$^6$ and is identical or not identical with R$^6$.

9. Polycarbonates according claim 6 characterized in that $R^6$ denotes hydrogen, n-alkyl radicals with 1 to 30 carbon atoms or their isomers, n-alkenyl radicals with 2 to 30 carbon atoms or their isomers, cyclo alkyl radicals with 5 to 12 carbon atoms, alkyl-substituted or alkenyl-substituted cycloalkyl radicals with 5 – 12 ring carbon atoms and 1 – 5 carbon atoms in the side chain, mononuclear or polynuclear aryl or heteroaryl radicals with up to 14 carbon atoms.

10. Polycarbonates according claim 9 wherein $R^6$ and R are not hydrogen.

11. High molecular weight polycarbonate, based on aromatic bishydroxy compounds, consisting essentially of structural units of the following structural formula:

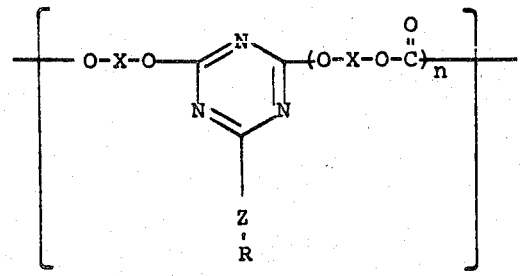

in which
   X denotes an o-, m- or p-phenylene radical, an o-, m- or p-phenylene radical with one or more $C_1-C_4$ lower alkyl or halogen substitutents, or a radical of the formula

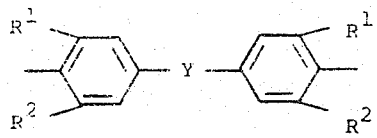

in which
   $R^1$ and $R^2$ represent hydrogen atoms, alkyl radicals with 1 to 4 carbon atoms or halogen, and have identical or different meanings,
   Y denotes a single bond, an alkylene or alkylidene radical with 1 to 7 carbon atoms, a cycloalkylene or cycloalkylidene radical with 5 to 12 carbon atoms,

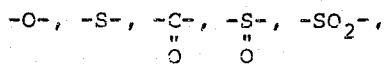

or a radical of the formulae:

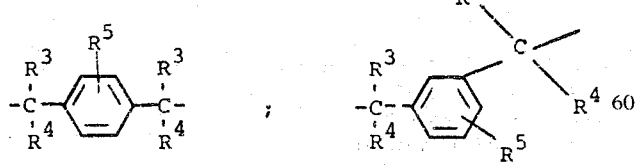

wherein
   $R^3$ to $R^5$ denote alkyl radicals with 1 to 5 carbon atoms, but
   $R^5$ can also represent halogen atoms, Z represents a single bond, —O—, —S—, —NH— or —$NR^6$—,
   $R^6$ denotes hydrogen, n-alkyl radicals with 1 to 30 carbon atoms or their isomers, n-alkenyl radicals with 2 to 30 carbon atoms or their isomers, cycloalkyl radicals with 5 to 12 carbon atoms, alkyl substituted or alkenyl-substituted cycloalkyl radicals with 5–12 ring carbon atoms and 1 to 5 carbon atoms in the side-chain, mononuclear or polynuclear aryl or heteroaryl radicals with up to 14 carbon atoms, or aralkyl radicals with a total of up to 30 carbon atoms, or the aryl-carbon atom bonded halogen and/or $C_1-C_6$-alkyl and/or $C_1-C_6$-alkoxy and/or nitro-substituted derivatives of the aryl, heteroaryl or aralkyl radicals;
   R has the same meaning as $R^6$, and is identical or not identical with $R^6$, and can be linked to $R^6$ via alkylene radicals with 2 to 5 carbon atoms which can be interrupted by hetero-atoms, such as O, S and $NR^7$, that is R + $R^6$ can be alkylene with 2 to 5 carbon atoms which can be interrupted by O, S and $NR^7$, with the proviso that the rings formed by R, Z and $R^6$ and from three- to six-membered rings;
   $R^7$ is an alkyl radical with 1 to 4 carbon atoms, a phenyl radical or an alkylaryl radical with a total of up to 10 carbon atoms,
or R and $R^6$ can be aryl linked via a single bond or O or S, and n is an integer between 1 and 20 inclusive, and 0.01 to 5 mol % relative to said structural units of branching sites of the following formula

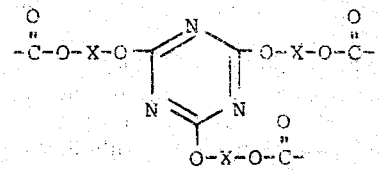

wherein X has the same meaning as above.

12. High molecular weight polycarbonates, based on aromatic bishydroxy compounds, consisting essentially of structural units of the following structural formula

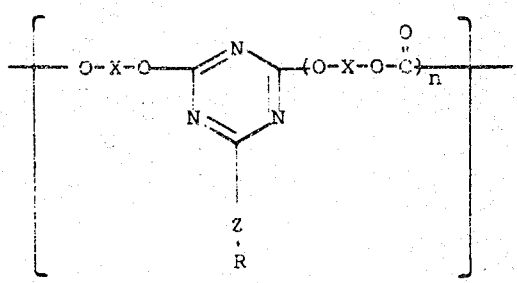

in which
   X denotes an o-, m- or p-phenylene radical, an o-, m- or p-phenylene radical with one or more $C_1-C_4$ lower alkyl or halogen substitutents, or a radical of the formula

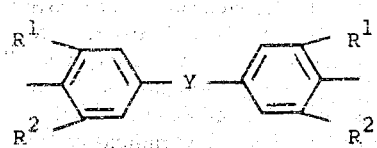

in which
- R¹ and R² represent hydrogen atoms, alkyl radicals with 1 to 4 carbon atoms or halogen, and have identical or different meanings,
- Y denotes a single bond, an alkylene or alkylidene radical with 1 to 7 carbon atoms, a cycloalkylene or cycloalkylidene radical with 5 to 12 carbon atoms,

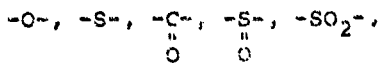

or a radical of the formulae:

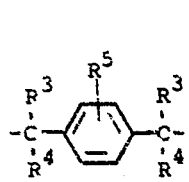 ; 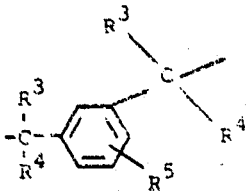

wherein
- R³ to R⁵ denote alkyl radicals with 1 to 5 carbon atoms, but
- R⁵ can also represent halogen atoms,
- Z represents —NR⁶—
- R⁶ denotes n-alkyl radicals with 1 to 30 carbon atoms or their isomers, n-alkenyl radicals with 2 to 30 carbon atoms or their isomers, cycloalkyl radicals with 5 to 12 carbon atoms, alkyl substituted or alkenyl-substituted cycloalkyl radicals with 5–12 ring carbon atoms and 1 to 5 carbon atoms in the sidechain, mononuclear or polynuclear aryl or heteroaryl radicals with up to 14 carbon atoms, or aralkyl radicals with a total of up to 30 carbon atoms, or the aryl-carbon atom bonded halogen and/or C₁–C₆-alkyl and/or C₁–C₆-alkoxy and/or nitro-substituted derivatives of the aryl, heteroaryl or aralkyl radicals;
- R has the same meaning as R⁶, and is identical or not identical with R⁶, and can be linked to R⁶ via alkylene radicals with 2 to 5 carbon atoms which can be interrupted by hetero-atoms, such as O, S and NR⁷, that is R + R⁶ can be alkylene with 2 to 5 carbon atoms which can be interrupted by O, S and NR⁷, with the proviso that the rings formed by R, Z and R⁶ are from three- to six-membered rings;
- R⁷ is an alkyl radical with 1 to 4 carbon atoms, a phenyl radical or an alkylaryl radical with a total of up to 10 carbon atoms,
- or R and R⁶ can be aryl linked via a single bond or O or S, and n is an integer between 1 and 20 inclusive.

13. High molecular weight polycarbonates, based on aromatic bishydroxy compounds, consisting essentially of structural units of the following structural formula

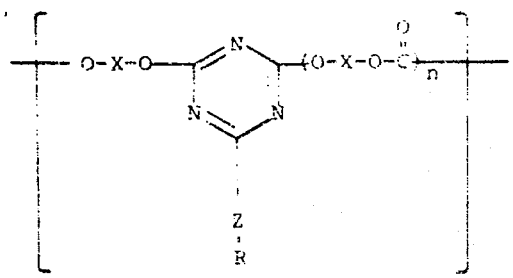

in which
- X denotes an o-, m- or p-phenylene radical, an o-, m- or p-phenylene radical with one or more C₁–C₄ lower alkyl or halogen substitutents, or a radical of the formula

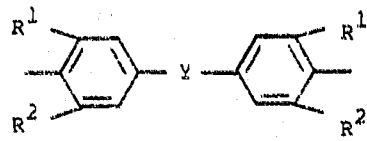

in which
- R¹ and R² represent hydrogen atoms, alkyl radicals with 1 to 4 carbon atoms or halogen, and have identical or different meanings,
- Y denotes a single bond, an alkylene or alkylidene radical with 1 to 7 carbon atoms, a cycloalkylene or cycloalkylidene radical with 5 to 12 carbon atoms,

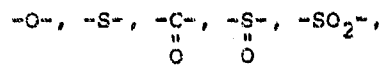

or a radical of the formulae:

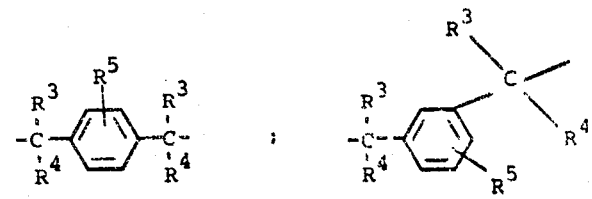

wherein
- R³ to R⁵ denote alkyl radicals with 1 to 5 carbon atoms, but
- R⁵ can also represent halogen atoms,
- Z represents —NR⁶—,
- R⁶ denotes n-alkyl radicals with 1 to 30 carbon atoms or their isomers, n-alkenyl radicals with 2 to 30 carbon atoms or their isomers, cycloalkyl radicals with 5 to 12 carbon atoms, alkyl substituted or alkenyl-substituted cycloalkyl radicals with 5–12 ring carbon atoms and 1 to 5 carbon atoms in the sidechain, mononuclear or polynuclear aryl or heteroaryl radicals with up to 14 carbon atoms, or aralkyl radicals with a total of up to 30 carbon atoms, or the aryl-carbon atom bonded halogen and/or C₁–C₆-alkyl and/or C₁–C₆-alkoxy and/or nitro-substituted derivatives of the aryl, heteroaryl or aralkyl radicals;
- R has the same meaning as R⁶, and is identical or not identical with R⁶, and can be linked to R⁶ via alkylene radicals with 2 to 5 carbon atoms which can be interrupted by hetero-atoms, such as O, S and NR⁷, that is R + R⁶ can be alkylene with 2 to 5 carbon atoms which can be interrupted by O, S and NR⁷, with the proviso that the rings formed by R, Z and R⁶ are from three- to six-membered rings;

$R^7$ is an alkyl radical with 1 to 4 carbon atoms, a phenyl radical or an alkylaryl radical with a total of up to 10 carbon atoms,
or R and $R^6$ can be aryl linked via a single bond or O or S, and $n$ is an integer between 1 and 20 inclusive, and 0.01 to 5 mol % relative to said structural units of branching sites of the following formula
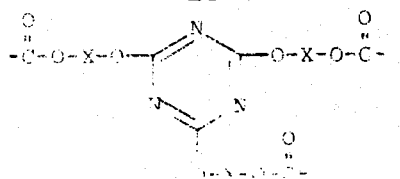
wherein X has the same meaning as hereinabove.
* * * * *